(12) United States Patent
Shibutani et al.

(10) Patent No.: US 9,296,887 B2
(45) Date of Patent: Mar. 29, 2016

(54) RESIN COMPOSITION AND MOLDED PRODUCT THEREOF

(75) Inventors: Mitsuo Shibutani, Osaka (JP); Norihito Sakai, Osaka (JP); Lars Boerger, Ludwigshafen (DE); Gabriel Skupin, Speyer (DE)

(73) Assignee: THE NIPPON SYNTHETIC CHEMICAL INDUSTRY CO., LTD., Osaka (JP)

( * ) Notice: Subject to any disclaimer, the term of this patent is extended or adjusted under 35 U.S.C. 154(b) by 1 day.

(21) Appl. No.: 14/004,701

(22) PCT Filed: Mar. 15, 2011

(86) PCT No.: PCT/JP2011/056694
§ 371 (c)(1),
(2), (4) Date: Sep. 12, 2013

(87) PCT Pub. No.: WO2012/124129
PCT Pub. Date: Sep. 20, 2012

(65) Prior Publication Data
US 2014/0004350 A1    Jan. 2, 2014

(51) Int. Cl.
*C08L 29/04* (2006.01)
*B32B 27/30* (2006.01)
*C08L 67/02* (2006.01)
*B32B 27/08* (2006.01)

(52) U.S. Cl.
CPC .............. *C08L 29/04* (2013.01); *B32B 27/08* (2013.01); *B32B 27/306* (2013.01); *C08L 67/02* (2013.01); *Y10T 428/31511* (2015.04); *Y10T 428/31551* (2015.04); *Y10T 428/31786* (2015.04)

(58) Field of Classification Search
CPC ............ C08F 16/06; C08G 3/12; C08G 3/16; C08L 67/02; C08L 29/04; B32B 27/08; B32B 27/306; Y10T 428/31511; Y10T 428/31551; Y10T 428/31786
USPC ............................. 525/56, 165, 174, 437, 445
See application file for complete search history.

(56) References Cited

U.S. PATENT DOCUMENTS

| | | | |
|---|---|---|---|
| 4,284,671 A * | 8/1981 | Cancio et al. | 428/36.6 |
| 2009/0286909 A1 * | 11/2009 | Shibutani et al. | 524/114 |
| 2011/0135950 A1 | 6/2011 | Okamoto et al. | |
| 2011/0237750 A1 * | 9/2011 | Ren et al. | 525/173 |

FOREIGN PATENT DOCUMENTS

| | | |
|---|---|---|
| EP | 2 322 578 A1 | 5/2011 |
| JP | 2004-075866 A | 3/2004 |
| WO | 2010/016595 A1 | 2/2010 |

OTHER PUBLICATIONS

"XP-002665143", Thomson Scientific.
Search Report from International Application No. PCT/JP2011/056694, mail date is Dec. 21, 2011.

* cited by examiner

*Primary Examiner* — Robert Jones, Jr.
(74) *Attorney, Agent, or Firm* — Greenblum & Bernstein, P.L.C.

(57) ABSTRACT

Provided is a resin composition from which a melt molded product which is excellent in transparency, gas barrier property and flexibility and has biodegradability can be obtained. The present invention relates to a resin composition, which comprises a polyvinyl alcohol-based resin (i) comprising a structural unit represented by the following general formula (1) and an aliphatic-aromatic polyester (ii) comprising a specific component, wherein each of $R^1$, $R^2$ and $R^3$ independently represents a hydrogen atom or an organic group, X represents a single bond or a bonding chain, and each of $R^4$, $R^5$ and $R^6$ independently represents a hydrogen atom or an organic group.

(1)

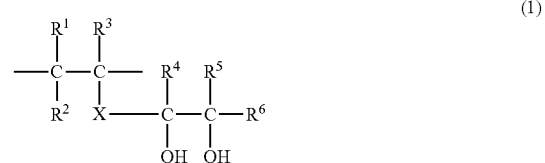

17 Claims, 1 Drawing Sheet

RESIN COMPOSITION AND MOLDED PRODUCT THEREOF

TECHNICAL FIELD

The present invention relates to a resin composition which comprises a polyvinyl alcohol-based resin as the main component, more illustratively, the invention relates to a resin composition from which a melt molded product which is excellent in transparency, gas barrier property and flexibility and has biodegradability can be obtained.

BACKGROUND OF THE INVENTION

Since polyvinyl alcohol (to be referred to as PVA hereinafter)-based resins are excellent in gas barrier property, toughness, transparency and the like, they are suitable as packaging material of various articles.

However, since a general PVA-based resin has the melting point close to the degradation temperature, its melt molding is substantially impossible, and as its molding method, a method in which it is made into an aqueous solution, and then this is cast and dried to make a film or coated on the surface of various substrate, followed by drying them have to be employed, and this limitation has been a great obstacle in broadly developing the PVA-based resins into packaging material applications.

Contrary to this, a PVA-based resin comprising a 1,2-diol component in its side chain has been proposed in recent years as a PVA-based resin which can be melt molded and is excellent in gas barrier property (e.g., see Patent Literature 1).

The high melting temperature and excellent gas barrier property of PVA-based resins arise from high crystallinity due to simple molecular structure and strong constraint of the molecular chain by the hydrogen bond between hydroxyl groups in the crystalline moiety and amorphous moiety. It is considered that such a PVA-based resin described in the Patent Literature 1 has a reduced melting point due to reduced crystallinity caused by the steric hindrance of the side chains, but in spite of this, the reduction of gas barrier property due to reduction of crystallinity is inhibited by the strong hydrogen bond by the hydroxyl groups in the side chains in the amorphous moiety.

CITATION LIST

Patent Literature

PTL 1: JP-A-2004-075866

SUMMARY OF INVENTION

Technical Problem

Flexibility is required for the material of a layer which constitutes a packaging material, particularly a film, a sheet and a laminate structure.

However, due to the high crystallinity, strong force of constraint by the hydrogen bond in the amorphous moiety and the like as described in the above, the PVA-based resins are poor in flexibility in comparison with other thermoplastic resins, and this point is also an obstacle in developing the PVA-based resins into packaging materials.

Though flexibility of the PVA-based resin described in Patent Literature 1 was slightly improved by the introduction of the side chains, it was still insufficient from the practical point of view.

For example, though this PVA-based resin is excellent in gas barrier property, there is a case where pin holes are formed when its film is repeatedly bent, and the gas barrier property is thereby lowered at a stretch.

In this connection, as the method for imparting flexibility to a brittle resin, there are broadly used a method in which it is blended with a plasticizer and a method in which it is blended with a resin having low modulus of elasticity and made into a polymer alloy of a sea-island structure which comprises the resin as an island component.

Though these attempts have also been made on the PVA-based resins, those having proper characteristics have not yet been found, because gas barrier property is reduced when a plasticizer is blended due to inhibition of crystallinity of the PVA-based resin and the method for making a sea-island structure type polymer alloy has a tendency of spoiling transparency due to difference in the index of refraction between the sea component and island component and poor interface adhesiveness.

That is, an object of the invention is to provide a resin composition from which a molded product having excellent transparency, gas barrier property and flexibility can be obtained.

Solution to Problem

By taking the above-mentioned situations into consideration, the present inventors have conducted intensive examinations and found as a result that the object of the invention can be attained by a resin composition which comprises a PVA-based resin (i) comprising a structural unit represented by the following general formula (1) and an aliphatic-aromatic polyester (to be referred to as AAPE hereinafter) (ii), thereby accomplishing the invention.

That is, the invention encompasses the following embodiments.

[1] A resin composition, which comprises a polyvinyl alcohol-based resin (i) comprising a structural unit represented by the following general formula (1) and an aliphatic-aromatic polyester (ii):

wherein each of $R^1$, $R^2$ and $R^3$ independently represents a hydrogen atom or an organic group, X represents a single bond or a bonding chain, and each of $R^4$, $R^5$ and $R^6$ independently represents a hydrogen atom or an organic group;

wherein AAPE include a polyester comprising, as essential components:

A) an acid component composed of
  a1) 40 to 75 mol % of at least one aliphatic dicarboxylic acid or its/their ester-forming derivatives or mixtures thereof,
  a2) 25 to 60 mol % of at least one aromatic dicarboxylic acid or its/their ester-forming derivative or mixtures thereof, and
  a3) 0 to 5 mol % of a sulfonated compound;

B) a diol component composed of at least one $C_2$- to $C_{12}$-alkanediol or mixtures thereof;

and, if desired, one or more components selected from

C) a component selected from
  c1) at least one dihydroxy compound comprising ether functions and having the formula (I)

$$HO\text{---}[(CH_2)_n\text{---}O]_m H \qquad (I)$$

where n represents 2, 3 or 4 and m represents an integer from 2 to 250, c2) at least one hydroxy-carboxylic acid of the formula (II)

$$HO\text{---}[C(O)\text{-}G\text{-}O]_p\text{---}H \qquad (II)$$

where p represents an integer from 1 to 1500 and G represents a radical selected from the group consisting of phenylene, o-hydroxyphenylene, —$(CH_2)_q$—, where q is an integer from 1 to 5, —C(R)H— and —C(R)HCH$_2$, where R represents methyl or ethyl, c3) at least one amino-$C_2$- to $C_{12}$-alkanol or at least one amino-$C_5$- to $C_{10}$-cycloalkanol or mixtures thereof, c4) at least one diamino-$C_1$- to $C_8$-alkane, c5) at least one 2,2'-bisoxazoline of the general formula (III)

where $R^1$ represents a single bond, a $(CH_2)_z$ alkylene group, where z=2, 3 or 4, or a phenylene group, c6) at least one amino carboxylic acid selected from the group consisting of natural amino acids, polyamides obtainable by polycondensation of a dicarboxylic acid having 4 to 6 carbon atoms and a diamine having 4 to 10 carbon atoms, compounds of the formula (IV)

$$HO\text{---}[C(O)\text{-}T\text{-}O]_s\text{---}H \qquad (IV)$$

where s represents an integer from 1 to 1500 and T represents a radical selected from the group consisting of phenylene, —$(CH_2)_u$—, where u represents an integer from 1 to 12, —C($R^2$)H— and —C($R^2$)HCH$_2$, where $R^2$ represents methyl or ethyl, or mixtures of c1) to c6);

and

D) a component selected from:
  d1) a compound having at least three groups capable of ester formation,
  d2) a di- or polyisocyanate,
  d3) a di- or polyepoxide
  or mixtures of d1) to d3), wherein a content ratio (i)/(ii) of the polyvinyl alcohol-based resin (i) to the AAPE (ii) is from 98/2 to 50/50 in terms of weight ratio.

[2] The resin composition according to [1], wherein all of $R^1$ to $R^6$ in the formula (1) represent a hydrogen atom, and X in the formula (1) represents a single bond.

[3] The resin composition according to [1], wherein a content of the structural unit represented by the general formula (1) contained in the polyvinyl alcohol-based resin (i) is 1 to 15% by mol.

[4] The resin composition according to [2], wherein a content of the structural unit represented by the general formula (1) contained in the polyvinyl alcohol-based resin (i) is 1 to 15% by mol.

[5] A molded product, which comprises a melt molded product of the resin composition according to any one of [1] to [4].

[6] A laminated film comprising a layer formed from the resin composition according to any one of [1] to [4], and a layer formed from another biodegradable polymer.

[7] A coextruded film comprising a layer formed from the resin composition according to any one of [1] to [4], and a layer formed from another biodegradable polymer.

In the molded product comprising a melt molded product of the resin composition of the invention, a sea-island structure wherein the PVA-based resin is the sea component and AAPE is the island component is formed, and it is considered that a fine and uniform sea-island structure was obtained by the use of the PVA-based resin (i) comprising the specified structure and the AAPE (ii) comprising the specified structure. As a result, a proper flexibility was obtained without inhibiting the gas barrier property of the PVA-based resin (i).

In addition, it is considered that the molded product by the resin composition of the invention has a proper interface condition between the sea composition and island component, which contributes to the flexibility and is a factor of obtaining a proper transparency.

ADVANTAGEOUS EFFECTS OF INVENTION

Since the molded product comprising a melt molded product of the resin composition of the invention is excellent in transparency, gas barrier property and flexibility, it is suitable as a packaging material of various articles and particularly useful as a material of a film, a sheet, a container or a layer constituting a laminate structure thereof.

In addition, since both of the PVA-based resin (i) and AAPE (ii) to be used in the invention are biodegradable, the resin composition of the invention comprising them is also biodegradable.

DESCRIPTION OF EMBODIMENTS

The explanation of elements described in the following is an example (typical example) of embodiments of the invention and is not specified by their contents.

The resin composition of the invention is a resin composition which comprises a PVA-based resin (i) and a AAPE (ii), wherein the PVA-based polymer (i) is a PVA-based resin (i) comprising a structural unit represented by the general formula (1) and the AAPE (ii) is a AAPE (ii).

The following describes in respective orders.

[PVA-Based Resin (i)]

Firstly, the PVA-based resin (i) to be used in the invention is described.

The PVA-based resin to be used in the resin composition of the invention comprises a structural unit represented by the following general formula (1), and in the general formula (1), each of $R^1$, $R^2$ and $R^3$ independently represents a hydrogen atom or an organic group, X represents a single bond or a bonding chain, and each of $R^4$, $R^5$ and $R^6$ independently represents a hydrogen atom or an organic group.

(1)

Particularly, most preferred is a case of the 1,2-diol structural unit represented by the general formula (1) in which all of $R^1$ to $R^3$ and $R^4$ to $R^6$ are hydrogen atom and X is a single bond, and a PVA-based resin comprising the structural unit represented by the following general formula (1') is suitably used.

(1')

In this connection, the $R^1$ to $R^3$ and $R^4$ to $R^6$ in the structural unit represented by the general formula (1) may be an organic group with the proviso that it is in such an amount that characteristics of the resin are not sharply spoiled, and as such an organic group, there may be mentioned for example an alkyl group having from 1 to 4 carbon atoms such as methyl group, ethyl group, n-propyl group, isopropyl group, n-butyl group, isobutyl group, and tert-butyl group, wherein such an organic group may have a functional group in response to the necessity, such as a halogen atom, hydroxyl group, ester group, carboxylic acid group, and sulfonate group.

In addition, X in the 1,2-diol structural unit represented by the general formula (1) is most desirably a single bond from the viewpoint of thermal stability and from the viewpoint of stability at a high temperature and under an acidic condition, but it may be a bonding chain within such a range that the effect of the invention is not inhibited, and as such a bonding chain, there may be mentioned hydrocarbons such as alkylene, alkenylene, alkynylene, phenylene, and naphthylene (these hydrocarbons may be substituted with a halogen group such as fluorine, chlorine, bromine and the like, and the like), as well as —O—, —(CH$_2$O)$_m$—, —(OCH$_2$)$_m$—, —(CH$_2$O)$_m$CH$_2$—, —CO—, —COCO—, —CO(CH$_2$)$_m$CO—, —CO(C$_6$H$_4$)CO—, —S—, —CS—, —SO—, —SO$_2$—, —NR—, —CONR—, —NRCO—, —CSNR—, —NRCS—, —NRNR—, —HPO$_4$—, —Si(OR)$_2$—, —OSi(OR)$_2$—, —OSi(OR)$_2$O—, —Ti(OR)$_2$—, —OTi(OR)$_2$—, —OTi(OR)$_2$O—, —OAl (OR)—, —OAl(OR)O— and the like (each R is independently an optional substituent, preferably a hydrogen atom or an alkyl group, and m is a natural number). Among these, an alkylene group having 6 or less carbon atoms, particularly methylene group, or —CH$_2$OCH$_2$— is desirable from the viewpoint of stability at the time of production or at the time of application.

Regarding the production method of the PVA-based resin to be used in the invention, it is not particularly limited, but suitably used are (i) a method in which a copolymer of a vinyl ester-based monomer with the compound represented by the following general formula (2) is saponified, (ii) a method in which a copolymer of a vinyl ester-based monomer with the compound represented by the following general formula (3) is subjected to saponification and carboxylic acid removal, and (iii) a method in which a copolymer of a vinyl ester-based monomer with the compound represented by the following general formula (4) is subjected to saponification and solvolysis of ketal structure.

(2)

(3)

(4)

Each $R^1$, $R^2$, $R^3$, X, $R^4$, $R^5$ and $R^6$ in the above-mentioned general formulae (2), (3) and (4) is the same as the case of the general formula (1). In addition, each of $R^7$ and $R^8$ independently represents a hydrogen atom or $R^9$—CO— (in the formula, $R^9$ is an alkyl group). Each of $R^{10}$ and $R^{11}$ independently represents a hydrogen atom or an organic group.

Regarding the methods of (i), (ii) and (iii), for example, the methods described in JP-A-2006-95825 can be used.

Particularly, from the viewpoint of being excellent in copolymerization reactivity and industrial handling property, it is desirable to employ the method of (i), in which a 3,4-diacyloxy-1-butene is used as the compound represented by the general formula (2), and 3,4-diacetoxy-1-butene is used particularly preferably.

In this connection, the reactivity ratio of each monomer when vinyl acetate was used as the vinyl ester-based monomer and this is copolymerized with 3,4-diacetoxy-1-butene is r (vinyl acetate)=0.710 and r (3,4-diacetoxy-1-butene)=0.701, and this shows that 3,4-diacetoxy-1-butene is superior in the copolymerization reactivity with vinyl acetate in comparison with the case of the vinylethylene carbonate as the compound represented by the general formula (3) to be used in the method of (ii), namely r (vinyl acetate)=0.85 and r (vinylethylene carbonate)=5.4.

Also, chain transfer constant of 3,4-diacetoxy-1-butene is Cx (3,4-diacetoxy-1-butene)=0.003 (65° C.), and this shows that it does not prevent increase of the degree of polymerization or cause lowering of polymerization rate, in comparison with the Cx (vinylethylene carbonate)=0.005 (65° C.) of vinylethylene carbonate and Cx (2,2-dimethyl-4-vinyl-1,3-dioxolan)=0.023 (65° C.) of 2,2-dimethyl-4-vinyl-1,3-dioxolan which is the compound represented by the general formula (4) used in the method of (iii).

In addition, since the by-product of this 3,4-diacetoxy-1-butene, which is generated when its copolymer is saponified, is identical to the compound by-produced at the time of saponification from the structural unit derived from vinyl acetate which is frequently used as a vinyl ester-based monomer, it is not necessary to arrange a special device or step for its post-treatment and solvent recovery system, and a point that the conventional equipment can be used is also an industrially large advantage.

In this connection, the above-mentioned 3,4-diacetoxy-1-butene can be produced for example by the synthesis method which uses an epoxybutene derivative and is described in WO 00/24702, U.S. Pat. No. 5,623,086, U.S. Pat. No. 6,072,079 and the like, or by a reaction in which an intermediate product of the 1,4-butanediol production process, namely 1,4-diacetoxy-1-butene, is isomerized using a metal catalyst such as palladium chloride or the like.

In addition, at the reagent level, a product of Acros can be obtained from the market.

In this connection, when decarboxylation or deacetalization of the PVA-based resin obtained by the method of (ii) or (iii) is insufficient, carbonate ring or acetal ring remains on the side chain, and when such a PVA-based resin is melt molded, there is a case in which the PVA-based resin is crosslinked by such a cyclic group and a gelled substance or the like are generated.

Accordingly, the PVA-based resin obtained by the method of (i) is suitably used in the invention also from this point of view.

As the above-mentioned vinyl ester-based monomer, there may be mentioned vinyl formate, vinyl acetate, vinyl propionate, vinyl valerate, vinyl butyrate, vinyl isobutyrate, vinyl pivalate, vinyl caprate, vinyl laurate, vinyl stearate, vinyl benzoate, vinyl versatate and the like, of which vinyl acetate is suitably used from the economical point of view.

Also, in addition to the above-mentioned monomers (vinyl ester-based monomers, the compounds represented by the general formulae (2), (3) and (4)), a compound including an α-olefin such as ethylene, and propylene; a hydroxy group-containing α-olefins such as 3-butene-1-ol, 4-pentene-1-ol and 5-hexane-1,2-diol and a derivative thereof such as an acylation product thereof; an unsaturated acids such as itaconic acid, maleic acid, and acrylic acid, or a salt or a mono- or dialkyl ester thereof; a nitriles such as acrylonitrile, an amides such as methacrylic amide, and diacetone acrylic amide, an olefin sulfonates such as ethylene sulfonate, allyl sulfonate, methallyl sulfonate, and AMPS or a salt thereof may be copolymerized as a copolymerization component within such a range that these do not exert a sharp influence on the physical properties of the resin.

A degree of saponification of the PVA-based resin (i) to be used in the invention (measured in accordance with JIS K 6726) which can be preferably employed is generally from 80% by mol to 100% by mol, preferably from 85% by mol to 99.9% by mol, more preferably from 88% by mol to 99.5% by mol, even more preferably from 95% by mol to 99% by mol. When such a degree of saponification is to too low, the melt viscosity becomes unstable at the time of melt molding so that there may be a case in which stable molding becomes difficult, an acetic acid odor is generated during the molding and remains in the molded product, or gas barrier property of the obtained molded product becomes insufficient.

In addition, an average degree of polymerization of the PVA-based resin (measured in accordance with JIS K 6726) which can be preferably employed is generally from 200 to 1800, preferably from 250 to 1500, more preferably from 300 to 1000, even more preferably from 300 to 500.

When such an average degree of polymerization is too small, there may be a case in which mechanical strength of the obtained molded product becomes insufficient, and when the average degree of polymerization is too large on the contrary, there may be a case in which the moldability is reduced due to insufficient fluidity, and there may be a tendency that thermal decomposition of the resin is apt to occur due to abnormal development of shearing heat generation at the time of molding.

A content of the 1,2-diol structural unit contained in the PVA-based resin (i), which can be preferably employed, is generally from 1% by mol to 15% by mol, preferably from 2% by mol to 10% by mol, more preferably from 3% by mol to 9% by mol. When such a content is too small, the melting point becomes high and becomes close to the thermal decomposition temperature, so that burnt deposits, gel and fish eye are apt to form due to thermal decomposition at the time of melt molding, and when it is too large on the contrary, metal adhesiveness and melt viscosity turn high, fluidity becomes poor at the time of melt molding and heat deterioration due to stagnation and the like is apt to occur.

In this connection, the content of the 1,2-diol structural unit in the PVA-based resin (i) can be calculated from $^1$H-NMR spectrum (solvent: DMSO-d6, internal standard: tetramethylsilane) of a completely saponified one of the PVA-based resin, and illustratively, it may be calculated from peak areas derived from hydroxyl group proton, methine proton and methylene proton in the 1,2-diol unit, methylene proton of the main chain, proton of hydroxyl group connecting to the principal chain and the like.

In addition, the stable viscosity behavior at melt-molding and excellent adhesiveness to another resin in the laminate structure can be obtained by adjusting the content ratio of acetic acid and alkali metal salt of acetic acid in the PVA-based resin (i) so as to have pH of water solution of the PVA-based resin (i) of 5.4 to 6.4. Such acetic acid and alkali metal salt of acetic acid are derived from alkali metal hydroxide used at the saponification step in the manufacture of the PVA-based resin (i), and acetic acid used at the neutralization step thereof.

In addition, the PVA-based resin (i) to be used in the invention may be a single species or a mixture of two or more species, and in that case, it may be an unmodified PVA other than the above-mentioned PVA-based resin (i) or a mixture with various kinds of modified PVA-based resins, but when a mixture is used, it is desirable that average values of the degree of polymerization, degree of saponification and content of 1,2-diol structural unit are within the above-mentioned ranges.

[AAPE (ii)]

Next, the AAPE (ii) to be used in the invention is described.

AAPE include polyesters comprising as essential components

A) an acid component composed of
   a1) 40 to 75 mol % of at least one aliphatic dicarboxylic acid or its/their ester-forming derivatives or mixtures thereof,
   a2) 25 to 60 mol % of at least one aromatic dicarboxylic acid or its/their ester-forming derivative or mixtures thereof, and
   a3) 0 to 5 mol % of a sulfonated compound, B) a diol component composed of at least one $C_2$- to $C_{12}$-alkanediol or mixtures thereof and, if desired, also one or more components selected from C) a component selected from
   c1) at least one dihydroxy compound comprising ether functions and having the formula (I)

$$HO-[(CH_2)_n-O]_m-H \qquad (I)$$

where n represents 2, 3 or 4 and m represents an integer from 2 to 250, c2) at least one hydroxy-carboxylic acid of the formula (II)

HO—[C(O)-G-O]$_p$—H (II)

where p represents an integer from 1 to 1500 and G represents a radical selected from the group consisting of phenylene, o-hydroxyphenylene, —(CH$_2$)$_q$—, where q is an integer from 1 to 5, —C(R)H— and —C(R)HCH$_2$, where R represents methyl or ethyl, c3) at least one amino-C$_2$- to C$_{12}$-alkanol or at least one amino-C$_5$- to C$_{10}$-cycloalkanol or mixtures thereof, c4) at least one diamino-C$_1$— to C$_s$-alkane, c5) at least one 2,2'-bisoxazoline of the general formula (III)

where R1 represents a single bond, a (CH$_2$)$_z$ alkylene group, where z=2, 3 or 4, or a phenylene group, c6) at least one amino carboxylic acid selected from the group consisting of natural amino acids, polyamides obtainable by polycondensation of a dicarboxylic acid having 4 to 6 carbon atoms and a diamine having 4 to 10 carbon atoms, compounds of the formula (IV)

HO—[C(O)-T-O]$_s$—H (IV)

where s represents an integer from 1 to 1500 and T represents a radical selected from the group consisting of phenylene, —(CH$_2$)$_n$—, where u represents an integer from 1 to 12, —C(R$^2$)H— and —C(R$^2$)HCH$_2$, where R$^2$ represents methyl or ethyl, or mixtures of c1) to c6);

and

D) a component selected from:
  d1) a compound having at least three groups capable of ester formation,
  d2) a di- or polyisocyanate,
  d3) a di- or polyepoxide
  or mixtures of d1) to d3).

The acid component A of AAPE in one preferred embodiment comprises from 40 to 70, in particular from 45 to 65 mol % of a1 and from 30 to 60, particularly from 35 to 55 mol % of a2.

As aliphatic acids and the corresponding derivatives a1 it is generally those with 2 to 18 carbon atoms, preferably 4 to 10 carbon atoms which are contemplated. They can be branched as well as linear. In principle, however, it is also possible to use dicarboxylic acids having a larger number of carbon atoms, for example up to 30 carbon atoms.

Suitable examples are oxalic acid, malonic acid, succinic acid, glutaric acid, 2-methylglutaric acid, 3-methylglutaric acid, α-ketoglutaric acid, adipic acid, pimelic acid, azelaic acid, sebacic acid, brassylic acid, fumaric acid, 2,2-dimethylglutaric acid, suberic acid, diglycolic acid, oxaloacetic acid, glutamic acid, aspartic acid, itaconic acid and maleic acid. The dicarboxylic acids or their ester-forming derivatives can be used individually or in the form of a mixture of two or more thereof.

Preference is given to using succinic acid, adipic acid, azelaic acid, sebacic acid, brassylic acid or their respective ester-forming derivatives or mixtures thereof. Particular preference is given to using succinic acid, adipic acid or sebacic acid or their respective ester-forming derivatives or mixtures thereof. Succinic acid, azelaic acid, sebacic acid and brassylic acid also have the advantage that they are available as renewable raw materials.

Particular preference is given to using adipic acid or its ester-forming derivatives, such as its alkyl esters or their mixtures or sebacic acid, or mixtures of sebacic acid with adipic acid.

The aromatic dicarboxylic acids or their ester-forming derivatives a2 can be used individually or in the form of a mixture of two or more thereof. Particular preference is given to using terephthalic acid or its ester-forming derivatives such as dimethyl terephthalate.

In general, the diols B are selected from branched or linear alkanediols having 2 to 12 carbon atoms, preferably 4 to 6 carbon atoms, or cycloalkane diols having 5 to 10 carbon atoms.

Examples of useful alkanediols are ethylene glycol, 1,2-propanediol, 1,3-propanediol, 1,2-butanediol, 1,4-butanediol, 1,5-pentanediol, 2,4-dimethyl-2-ethylhexane-1,3-diol, 2,2-dimethyl-1,3-propanediol, 2-ethyl-2-butyl-1,3-propanediol, 2-ethyl-2-isobutyl-1,3-propanediol, 2,2,4-trimethyl-1,6-hexanediol, particularly ethylene glycol, 1,3-propanediol, 1,4-butanediol and 2,2-dimethyl-1,3-propanediol (neopentyl glycol); cyclopentanediol, 1,4-cyclohexanediol, 1,2-cyclohexanedimethanol, 1,3-cyclohexanedimethanol, 1,4-cyclohexanedimethanol or 2,2,4,4-tetramethyl-1,3-cyclobutanediol. Particular preference is given to 1,4-butanediol, particularly combined with adipic acid as component a1) and 1,3-propanediol, particularly combined with sebacic acid as component a1). 1,3-Propanediol additionally has the advantage that it is available as a renewable raw material. Mixtures of different alkanediols can also be used.

Depending on whether an excess of acid or OH end groups is desired, either component Component B is usually be used in excess. In a preferred embodiment, the A:B molar ratio of the components used can be in the range from 0.4:1 to 1:1 and preferably in the range from 0.6:1 to 1:1.

The preferred AAPE are characterized by a molecular weight (Mn) in the range from 1000 to 100 000, particularly in the range from 9000 to 75 000 g/mol and preferably in the range from 10 000 to 50 000 g/mol and a melting point in the range from 60 to 170° C. and preferably in the range from 80 to 150° C.

The AAPE mentioned may have hydroxyl and/or carboxyl end groups in any desired proportion. The partly aromatic polyesters mentioned can also be subjected to end group modification. For instance, OH end groups can be acid modified by reaction with phthalic acid, phthalic anhydride, trimellitic acid, trimellitic anhydride, pyromellitic acid or pyromellitic anhydride.

AAPE shall for the purposes of the present invention also comprise polyester derivatives such as polyether esters, polyester amides or polyether ester amides. Useful partly aromatic polyesters include linear non-chain-extended polyesters (WO 92/09654). Preference is given to chain-extended and/or branched partly aromatic polyesters. The latter are known from the above-cited references WO 96/15173 to 15176, which are each expressly incorporated herein by reference. Mixtures of different partly aromatic polyesters are similarly useful. Interesting recent developments are based on renewable raw materials (see WO-A 2006/097353, WO-A 2006/097354 and EP 08165372.7). AAPE are to be understood as meaning in particular products such as Ecoflex® (BASF SE) and Origo-Bi® (Novamont).

[Resin Composition]

The resin composition of the invention comprises the above-mentioned PVA-based resin (i) and the above-mentioned AAPE (ii).

The content ratio (i/ii) (weight ratio) of the PVA-based resin (i) to AAPE (ii) in the resin composition of the invention, which can be preferably employed, is within the range of generally from 98/2 to 50/50, preferably from 95/5 to 60/40, more preferably from 80/20 to 70/30. In the resin composition of the present invention, a sea-island structure wherein the PVA-based resin (i) is the sea component and AAPE (ii) is the island component is formed, and excellent gas barrier property can be obtained by the sea component which is the continuous phase, and excellent flex crack resistance can be obtained by the flexible island component. Therefore, when such a content ratio is too large, there may be a case where sufficient flex crack resistance cannot be obtained when made into a molded product, and when it is too small on the contrary, there is a tendency that the gas barrier property becomes insufficient.

The resin composition of the invention may contain other polymer within such a range that it does not inhibit the effect of the invention. As the polymer which can be contained, there may be mentioned, for example, various thermoplastic resins such as polyamide, polyester, polyethylene, polypropylene, and polystyrene. Particularly, the resin composition of the invention may contain further biodegradable polymers such as polylactic acid, for example NatureWorks® 4020 or 4043D (polylactic acid from NatureWorks) or polylactic acid from Synbra; polyhydroxyalkanoates are primarily poly-4-hydroxybutyrates and poly-3-hydroxybutyrates, but further comprise copolyesters of the aforementioned hydroxybutyrates with 3-hydroxyvalerates or 3-hydroxyhexanoate. Poly-3-hydroxybutyrate-co-4-hydroxybutyrates are known from Metabolix in particular. They are marketed under the trade name of Mirel®. Poly-3-hydroxybutyrate-co-3-hydroxyhexanoates are known from P&G or Kaneka. Poly-3-hydroxybutyrates are marketed for example by PHB Industrial under the trade name of Biocycle® and by Tianan under the name of Enmat®. Aliphatic polyesters comprising units derived from aliphatic diols and aliphatic dicarboxylic acids such as polybutylene succinate (PBS), polybutylene succinate adipate (PBSA), polybutylene succinate sebacate (PBSSe), polybutylene sebacate (PBSe) or corresponding polyester amides. The aliphatic polyesters are marketed by Showa Highpolymers under the name of Bionolle and by Mitsubishi under the name of GSPla. More recent developments are described in WO 2010/034711.

In addition, within the range of not inhibiting the effect of the invention and in response to the necessity, the resin composition of the invention may contain a reinforcing agent, a filler, a plasticizer, a pigment, a dyestuff, a lubricant, an antioxidant, an antistatic agent, an ultraviolet ray absorber, a heat stabilizer, a light stabilizer, a surfactant, an antibacterial agent, an antistatic agent, a desiccant, an anti-blocking agent, a flame retarder, a crosslinking agent, a curing agent, a foaming agent, a nucleating agent, other thermoplastic resin and the like.

The resin composition of the invention can be prepared by a method and device which are used in the general mixing of high molecular substances, and a method by melt kneading is particularly suitably used. As such a melt kneading device, a kneading machine, an extruder, a mixing roller, a Banbury mixer, a kneader and the like can be mentioned, and a method which uses an extruder is particularly suitable because continuous treatment can be carried out by the extruder and the extruder is excellent in mixing efficiency.

As the condition for obtaining the resin composition of the invention by melt kneading it using such an extruder, a range of from 160° C. to 230° C. is generally employed, though it is necessary to optionally adjust it in response to the melting point and the like of the PVA-based resin (i).

The resin composition of the invention obtained by such a mixing is generally made into a shape such as a pellet, and a powder for the purpose of using it as a molding material. It is particularly desirable to make into a pellet shape from the viewpoint of fewer problems regarding its charging into a molding machine, its handling and generation of fine powder.

In this connection, a conventionally known method can be used for the molding into such a pellet shape, but a method in which the composition is extruded from the above-mentioned extruder into a strand shape and, after cooling, cut into a predetermined length to form a pellet of cylindrical shape is effect.

[Molded Product]

Since the resin composition of the invention is excellent in moldability, particularly melt moldability, it is useful as a molding material. As the melt molding method, a conventionally known molding method such as extrusion molding, inflation molding, injection molding, blow molding, vacuum molding, pressure molding, compression molding, and calender molding can be used.

In addition, as the molded product obtained from the resin composition of the invention, there may be mentioned those which have a great variety of shapes such as a film, a sheet, a pipe, a disc, a ring, a pocket product, a bottle like product, and a fibrous product.

Further, it is possible to form a laminate structure of a layer consisting of the resin composition of the invention and a layer by other material.

Particularly, though the resin composition of the invention comprises the PVA-based resin as the main component and the excellent gas barrier property can be obtained therefrom under a low humidity condition, there may be a case where its characteristics are greatly changed by moisture absorption, so that it is desirable to use it as a laminate structure in which a material having high water vapor barrier property is arranged on the surface.

As such a material having high water vapor bather property, for example, there may be mentioned a thermoplastic resin typified by a polyolefin-based resin such as low density polyethylene, middle density polyethylene, high density polyethylene, ethylene-vinyl acetate copolymer, ethylene-propylene copolymer, and polypropylene, a polyester-based resin such as polyethylene terephthalate, and polybutylene terephthalate, a vinyl chloride-based resin such as polyvinyl chloride, and polyvinylidene chloride, and a polyamide-based resin such as nylon, a thermosetting resin such as epoxy resin and phenol resin, a metal, a metalized film of various metals, and the like, which can be selected in response to its application and desired characteristics.

In such a laminate structure, an adhesive layer may be intervened between the layer comprising the resin composition of the invention and the layer comprising other material, and as the adhesive to be used in such an adhesive layer, for example, there may be mentioned a carboxyl group-containing modified olefin-based polymer such as maleic anhydride-modified polyethylene, maleic anhydride-modified polypropylene, and maleic anhydride-modified ethylene-vinyl acetate copolymer, and the like.

In this connection, as the method for forming such a laminate structure, in the case of laminating with a thermoplastic resin, co-extrusion, co-injection and the like are possible, and as other methods, there can be employed various methods in response to the desired shape, thickness and the like, such as extrusion coating or a method in which respective layers are formed in advance and these are laminated.

Particularly preferred are laminated or coextruded structures wherein one layer is formed from a resin according to the invention and one or more further layers formed from another biodegradable polymer such as polylactic acid, polyhydroxyalcanoate AAPE or aliphatic polyesters such as polybutylene succinate (PBS), polybutylene succinate adipate (PBSA), polybutylene succinate sebacate (PBSSe), polybutylene sebacate (PBSe) or corresponding polyester amides or mixtures of these biodegradable polymers.

Since the molded product comprising the resin composition of the invention has excellent barrier property for various gases and further has excellent flexibility and flex crack resistance, it can be used in articles from which these characteristics are required. As an example of such an application, there may be mentioned a packaging material for food or drink, a container, an inner bag for bag in box, packing for container, a transfusion bag for medical treatment, a container for organic liquid, a pipe for organic liquid transportation, a container for various gases, a tube, a hose and the like. Multilayer composites are interesting for food packaging for e.g. beverages, vegetables, fruits, meat, diary, coffee, tea, cosmetics and medical drugs.

In addition, it is possible to use it in various electrical components, automobile parts, parts for industrial use, leisure goods, sports goods, daily necessities, toys, medical tools and the like.

EXAMPLES

The following describes the invention with reference to examples, though the invention is not limited to the descriptions of the examples without exceeding its gist.

In this connection, each of the terms "part(s)" and "%" as used in the examples means weight basis unless otherwise noted.

Production Example 1

Production of PVA-Based Resin (A1)

Into a reaction container equipped with a reflux condenser, a dropping funnel and a stirrer, 68.0 parts of vinyl acetate, 23.8 parts of methanol and 8.2 parts of 3,4-diacetoxy-1-butene was added, and 0.3% by mol of azobisisobutyronitrile (based on the added vinyl acetate) was further added, and polymerization was started by rising the temperature while stirring under a stream of nitrogen. When the rate of polymerization of vinyl acetate reached 90%, the reaction was terminated by adding m-dinitrobenzene, and subsequently, unreacted vinyl acetate monomers were removed from the system by a method of blowing steam of methanol to obtain a methanol solution of copolymer.

Next, the above-mentioned methanol solution was further diluted with methanol to adjust the concentration thereof to 45%, followed by adding into a kneader, and while keeping the liquid temperature at 35° C., saponification was carried out by adding a 2% methanol solution of sodium hydroxide at ratio of 10.5 mmol based on 1 mol in total amount of the structural unit derived from vinyl acetate and the structural unit derived from 3,4-diacetoxy-1-butene in the copolymer. A saponified product was precipitated as the saponification was progressed, and when it became particle forms, these were collected by filtration, followed by washing thoroughly with methanol and drying in a hot air dryer to obtain the desired PVA-based resin (i).

When analyzed based on the alkali consumption required for hydrolyzing remaining vinyl acetate and 3,4-diacetoxy-1-butene, degree of saponification of the thus obtained PVA-based resin (i) was 98.9% by mol. Also, the average degree of polymerization was 450 when analyzed in accordance with JIS K 6726. In addition, the content of the 1,2-diol structural unit represented by the general formula (1) was 6% by mol when calculated from the integral values measured by a $^1$H-NMR (300 MHz proton NMR, d6-DMSO solution, internal standard substance; tetramethylsilane, 50° C.).

Production Example 2

Production of AAPE (B1)

To prepare the polyester B1, 87.3 kg of dimethyl terephthalate, 80.3 kg of adipic acid, 117 kg of 1,4-butanediol, and 0.2 kg of glycerol were mixed with 0.028 kg of tetrabutyl orthotitanate (TBOT), the molar ratio between alcohol components and acid components being 1.30. The reaction mixture was heated to a temperature of 180° C. and reacted for 6 h at this temperature. The temperature was then increased to 240° C., and the excess dihydroxy compound was removed by distillation in vacuo over a period of 3 h. 0.9 kg of hexamethylene diisocyanate were then slowly metered in at 240° C. within a period of 1 h.

The resultant polyester B1 had a melting point of 119° C. and a molar mass (Mn) of 23 000 g/mol.

Example 1

Preparation of Resin Composition

After dry-blending 80 parts by weight of the PVA-based resin (A1) obtained in Production Example 1 with 20 parts by weight of the AAPE(B1) obtained in Production Example 2, this was melt kneaded using a twin screw extruder under the following conditions, followed by extruding into a strand shape and cutting out using a pelletizer, thereby obtaining a resin composition in the form of cylindrical pellets.
Diameter (D): 15 mm
L/D=60
Screw revolution: 200 rpm
Temperature setting: C1/C2/C3/C4/C5/C6/C7/C8/D=120/150/180/195/200/2001210/210/210° C.
Screw pattern: three point kneading screw
Screen mesh: 90/90 mesh
Discharge rate: 1.5 kg/hr
[Preparation of Film]

The thus obtained pellet was subjected to film formation using an extruder under the following conditions to prepare a single layer film having a thickness of about 30 μm, and the following evaluations were carried out. The results are shown in Table 1.
Diameter (D): 15 mm
L/D=60
Screw revolution: 200 rpm
Temperature setting: C1/C2/C3/C4/C5/C6/C7/C8/D=150/180/190/195/200/210/210/210/210° C.
Discharge rate: 1.5 kg/hr
Screen mesh: 90/90 mesh
Die: 300 mm in width, a coat hanger type
Take over rate: 2.6 m/min
Roller temperature: 50° C.

Air gap: 1 cm
(Oxygen Permeability)

Oxygen permeability of the obtained film at 23° C. under 65% RH was measured using an oxygen permeability tester ("Oxtran 2/20" manufactured by MOCON). The results are shown in Table 1.
(Flexibility)

Flex crack test of the obtained film was carried out using Gelbo Flex Tester (manufactured by Rigaku Kogyo Co., Ltd.) under the following conditions.
Test environment: 23° C., 50% RH
Flex crack condition: After advance of 2.5 inches, twist 440° while advancing 3.5 inches
Cycle: 40 cycles/min
Flex crack times: 100 times A sample of 28 cm×17 cm was cut out from the central part of the film after the test, and the number of pin holes was counted. Such a test was carried out 5 times, and the average value was calculated. The results are shown in Table 1.
(Transparency)

Inner haze of the obtained film was measured using a haze meter ("Haze Meter NDH 2000" manufactured by NIPPON DENSHOKU INDUSTRIES CO., LTD.). The results are shown in Table 1.
(Biodegradability)

Figure 1:
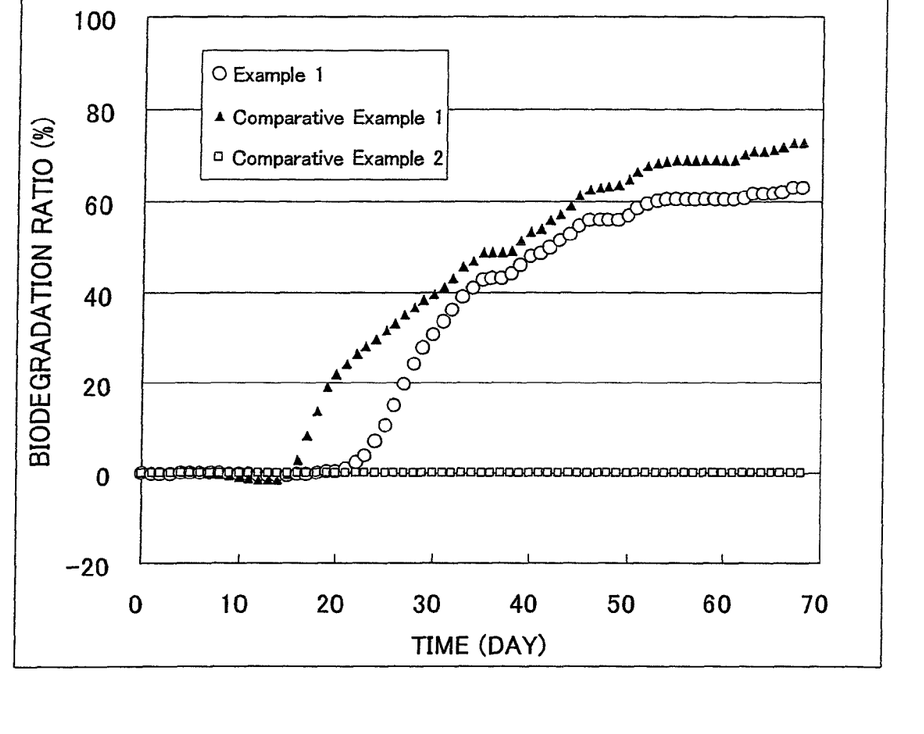
FIG. 1 shows a graph showing the variation of biodegradation ratio with time in Example 1, Comparative Example 1 and Comparative Example 2.

In accordance with the biodegradability evaluation method described in ISO 14851, 100 mg/liter of the obtained film was added to 300 ml of a standard test culture medium containing 30 mg/liter of activated sludge at a sewage treatment plant in Osaka, followed by cultivating at 25±1° C. for 68 days, and amount of oxygen consumed in its biodegradation was measured using a closed system oxygen demand analyzer ("Coulometer OM3001A" manufactured by Ohkura Electric Co., Ltd.) to calculate biodegradation ratio from the values. The results are shown in FIG. 1. Also, the biodegradation ratio after 60 days is shown in Table 1.

Example 2

A resin composition and a film were prepared in the same manner as in Example 1, except that blending amount of the PVA-based resin (A1) was changed to 70 parts by weight, and blending amount of the AAPE (B1) was changed to 30 parts by weight, and evaluated in the same manner. The results are shown in Table 1.

Comparative Example 1

A resin composition and a film were prepared in the same manner as in Example 1, except that AAPE (B1) was not blended in Example 1, and evaluated in the same manner. The results are shown in Table 1.

Comparative Example 2

A resin composition and a film were prepared in the same manner as in Example 1, except that polylactic acid (4032D manufactured by Nature Works) was used instead of the resin composition made from the PVA-based resin (A1) and AAPE (B1), and its biodegradability was evaluated in the same manner. The results are shown in Table 1.

Comparative Example 3

A resin composition and a film were prepared in the same manner as in Example 1, except that an acid-modified styrene/ethylene/butylene block copolymer ("Tuftec M 1913", manufactured by Asahi Chemical Industry Co., Ltd.) was used instead of the AAPE (B1), and evaluated in the same manner. The results are shown in Table 1.

TABLE 1

|  | Oxygen permeability (cc · 30 μm/m² · day) | Flexibility (the number of pin holes) | Transparency | Biodegradation ratio (%) |
|---|---|---|---|---|
| Example 1 | 0.16 | 120 | 1.3 | 60 |
| Example 2 | 0.18 | 62 |  | — |
| Comparative Example 1 | 0.11 | crack | 0.2 | 69 |
| Comparative Example 2 |  |  |  | 0 |
| Comparative Example 3 | 0.32 | 92 | 16 | — |

As is evident from these results, the films obtained from the resin compositions of Examples 1 and 2, in which the PVA-based resin (i) comprising the structural unit represented by the formula (1) is blended with the AAPE (B1), are excellent in gas barrier property and flexibility, transparency.

In addition, as is evident from the result of biodegradation ratio after 60 days in Table 1 and FIG. 1, despite the film of Example 1 comprises AAPE which is not water-soluble, the film shows the biodegradability in water nearly equal to the case of the film of Comparative Example 1 which is water-soluble and biodegradable. On the other hand, the film of Comparative Example 2, which is made from only polylactic acid which is not water-soluble, shows the inferior biodegradability in water.

On the other hand, the film of Comparative Example 1 in which the AAPE (B1) was not blended was excellent in gas barrier property and transparency but extremely poor in flexibility.

In addition, the film of Comparative Example 3 in which the styrene/ethylene/butylene block copolymer broadly used as a flexibility improving agent of PVA-based resins was blended instead of the AAPE (B1) was excellent in flexibility but insufficient from the viewpoint of gas barrier property and transparency.

INDUSTRIAL APPLICABILITY

Since the molded product comprising a melt molded product of the resin composition of the invention is excellent in transparency, gas barrier property and flexibility, it can be used as a packaging material of various articles and can be suitably used particularly as a film, a sheet, a container and a constitution layer of a laminate structure, to be used for packaging an article which must be prevented from deterioration by oxidation, such as food and medicament, and also as a material such as of a container, a tube and a hose for hydrogen gas use which require high gas barrier property and flexibility.

In addition, since the resin composition of the invention is biodegradable, it is possible to use it as a material of various molded products which requires biodegradability, particularly as a packaging material which is completely biodegradable and excellent in gas barrier property, by making it into a laminate structure with a biodegradable resin such as polylactic acid.

The invention claimed is:

1. A resin composition, which comprises a polyvinyl alcohol-based resin (i) comprising a 1,2-diol structural unit represented by the following formula (1) in an amount of 1 to 15% by mol and an aliphatic-aromatic polyester (ii):

wherein each of $R^1$, $R^2$ and $R^3$ independently represents a hydrogen atom or an alkyl group having from 1 to 4 carbon atoms, X represents a single bond or an alkylene group having 6 or less carbon atoms, and each of $R^4$, $R^5$ and $R^6$ independently represents a hydrogen atom or an alkyl group having from 1 to 4 carbon atoms;

wherein the aliphatic-aromatic polyester (ii) includes a polyester comprising, as essential components:

A) an acid component composed of
  a1) 40 to 75 mol % of at least one aliphatic dicarboxylic acid or its/their ester-forming derivatives or mixtures thereof,
  a2) 25 to 60 mol % of at least one aromatic dicarboxylic acid or its/their ester-forming derivative or mixtures thereof, and
  a3) 0 to 5 mol % of a sulfonated compound;
B) a diol component composed of at least one $C_2$- to $C_{12}$-alkanediol or mixtures thereof;
and, optionally, one or more components selected from
C) a component selected from
  c1) at least one dihydroxy compound comprising ether functions and having the formula I HO—[(CH$_2$)$_n$—O]$_m$—H          (I)

where n represents 2, 3 or 4 and m represents an integer from 2 to 250,
  c2) at least one hydroxy-carboxylic acid of the formula II HO—[C(O)-G-O]$_p$—H          (II)

where p represents an integer from 1 to 1500 and G represents a radical selected from the group consisting of phenylene, o-hydroxyphenylene, —(CH$_2$)$_q$—, where q is an integer from 1 to 5, —C(R)H— and —C(R)HCH$_2$, where R represents methyl or ethyl,
  c3) at least one amino-$C_2$- to $C_{12}$-alkanol or at least one amino-$C_5$- to $C_{10}$-cycloalkanol or mixtures thereof,
  c4) at least one diamino-$C_1$- to $C_8$-alkane,
  c5) at least one 2,2'-bisoxazoline of the formula III where R1 represents a single bond, a (CH$_2$)$_z$ alkylene group, where z=2, 3 or 4, or a phenylene group,
  c6) at least one amino carboxylic acid selected from the group consisting of natural amino acids, polyamides obtainable by polycondensation of a dicarboxylic acid having 4 to 6 carbon atoms and a diamine having 4 to 10 carbon atoms, compounds of the formula IV HO—[C(O)-T-O]$_s$—H          (IV)

where s represents an integer from 1 to 1500 and T represents a radical selected from the group consisting of phenylene, —(CH$_2$)$_u$—, where u represents an integer from 1 to 12, —C(R$^2$)H— and —C(R$^2$)HCH$_2$, where R$^2$ represents methyl or ethyl,
  or mixtures of c1) to c6);
and
D) a component selected from:
  d1) a compound having at least three groups capable of ester formation,
  d2) a di- or polyisocyanate,
  d3) a di- or polyepoxide
  or mixtures of d1) to d3),
wherein a content ratio (i)/(ii) of the polyvinyl alcohol-based resin (i) to the aliphatic-aromatic polyester (ii) is from 95/5 to 60/40 in terms of weight ratio.

2. The resin composition according to claim 1, wherein all of $R^1$ to $R^6$ in the formula (1) represent a hydrogen atom, and X in the formula (1) represents a single bond.

3. The resin composition according to claim 1, wherein a content of the structural unit represented by the formula (1) contained in the polyvinyl alcohol-based resin (i) is 1 to 15% by mol.

4. The resin composition according to claim 2, wherein a content of the structural unit represented by the formula (1) contained in the polyvinyl alcohol-based resin (i) is 1 to 15% by mol.

5. A molded product, which comprises a melt molded product of the resin composition according to claim 1.

6. A laminated film comprising a layer formed from the resin composition according to claim 1, and a layer formed from another biodegradable polymer.

7. A coextruded film comprising a layer formed from the resin composition according to claim 1, and a layer formed from another biodegradable polymer.

8. A molded product, which comprises a melt molded product of the resin composition according claim 2.

9. A laminated film comprising a layer formed from the resin composition according to claim 2, and a layer formed from another biodegradable polymer.

10. A coextruded film comprising a layer formed from the resin composition according to claim 2, and a layer formed from another biodegradable polymer.

11. A molded product, which comprises a melt molded product of the resin composition according claim 3.

12. A laminated film comprising a layer formed from the resin composition according to claim 3, and a layer formed from another biodegradable polymer.

13. A coextruded film comprising a layer formed from the resin composition according to claim 3, and a layer formed from another biodegradable polymer.

14. A molded product, which comprises a melt molded product of the resin composition according claim 4.

15. A laminated film comprising a layer formed from the resin composition according to claim 4, and a layer formed from another biodegradable polymer.

16. A coextruded film comprising a layer formed from the resin composition according to claim 4, and a layer formed from another biodegradable polymer.

17. A resin composition according to claim 1, wherein a content ratio (i)/(ii) of the polyvinyl alcohol-based resin (i) to the aliphatic-aromatic polyester (ii) is from 80/20 to 60/40 in terms of weight ratio.

* * * * *